Dec. 6, 1932.    A. S. FITZ GERALD    1,890,321
CONTROL AND PROTECTION OF ELECTRIC CIRCUITS
Filed April 30, 1929    3 Sheets-Sheet 1

Inventor:
Alan S. FitzGerald,
by Charles E. Tullar
His Attorney.

Patented Dec. 6, 1932

1,890,321

UNITED STATES PATENT OFFICE

ALAN S. FITZ GERALD, OF SCHENECTADY, NEW YORK, ASSIGNOR TO GENERAL ELECTRIC COMPANY, A CORPORATION OF NEW YORK

CONTROL AND PROTECTION OF ELECTRIC CIRCUITS

Application filed April 30, 1929. Serial No. 359,353.

My invention relates to improvements in the control and protection of electric circuits. An object of my invention is to provide improved control and protective apparatus whereby to obtain, on the occurrence of faults, reliability of operation with a degree of selectivity substantially wholly dependent on the condition of the circuit or its insulation and quite independent of the condition of energization of the circuit at the power frequency and without the use of pilot wires and the like.

Another object of my invention is to permit the connection of the circuit to the power system only after a feeling out process which eliminates subjecting the circuit interrupters to the unnecessary duty involved in closing them on a faulty circuit.

My invention will be better understood from the following description when considered in connection with the accompanying drawings and its scope will be pointed out in the appended claims.

Figure 1:
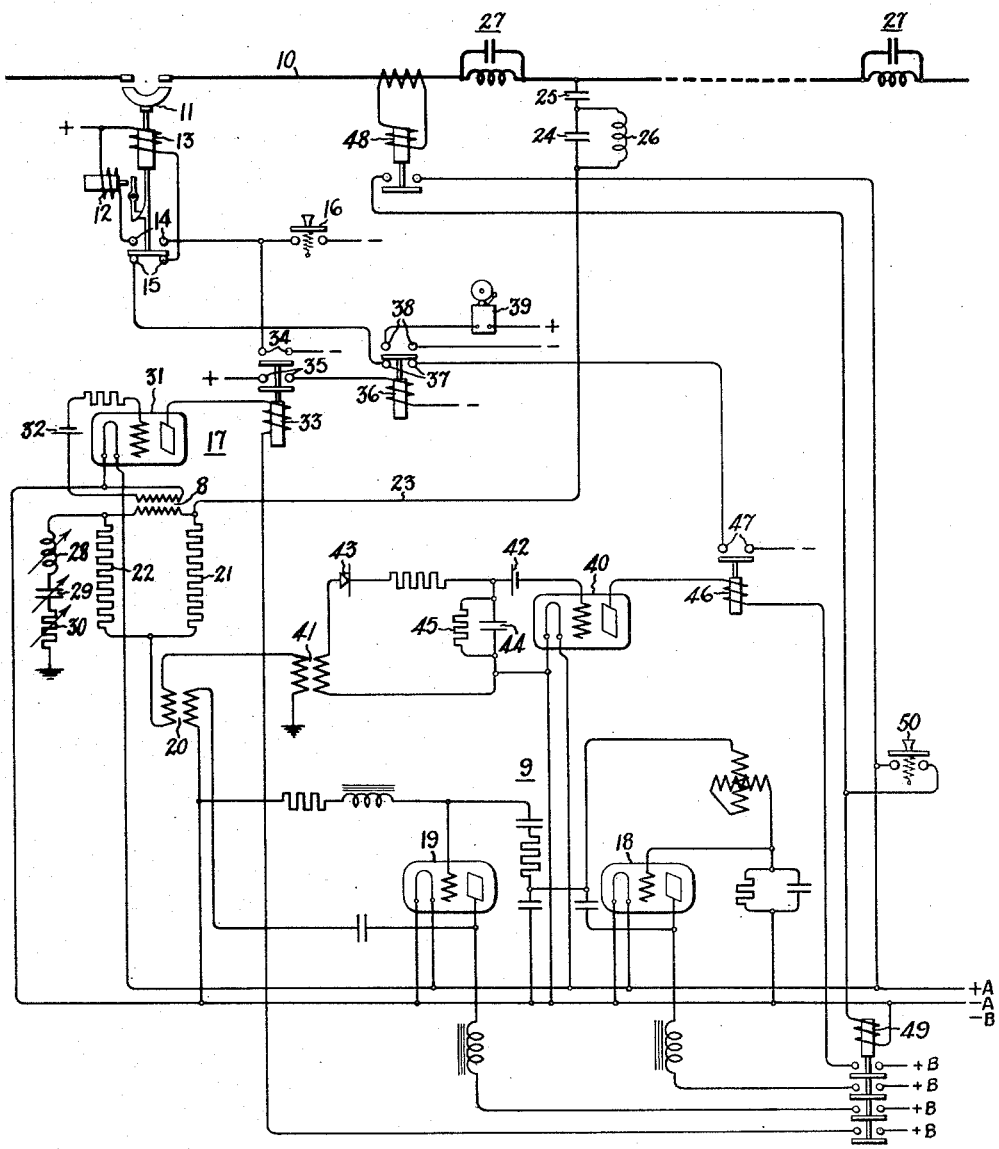
Figure 2:
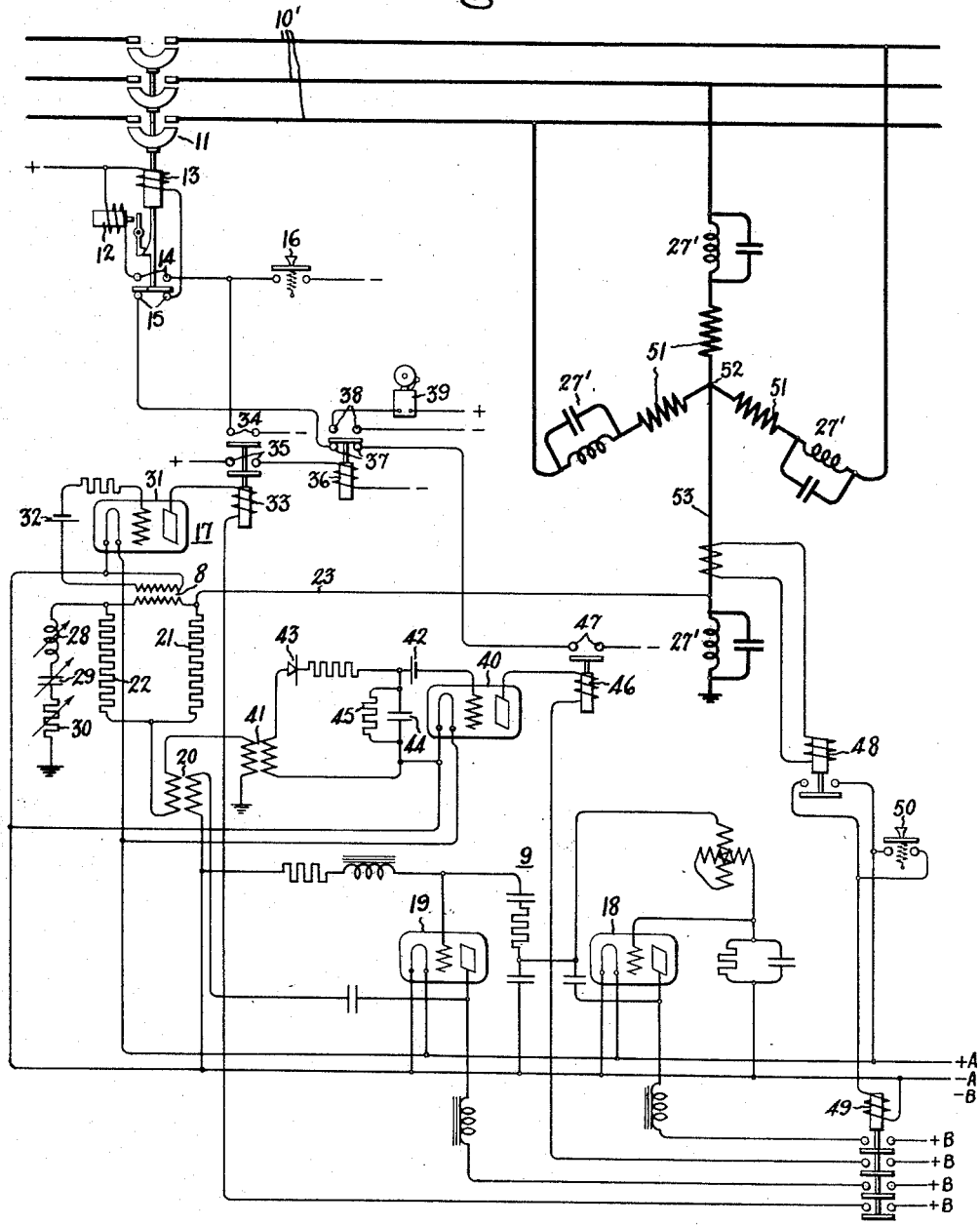
Figure 3:
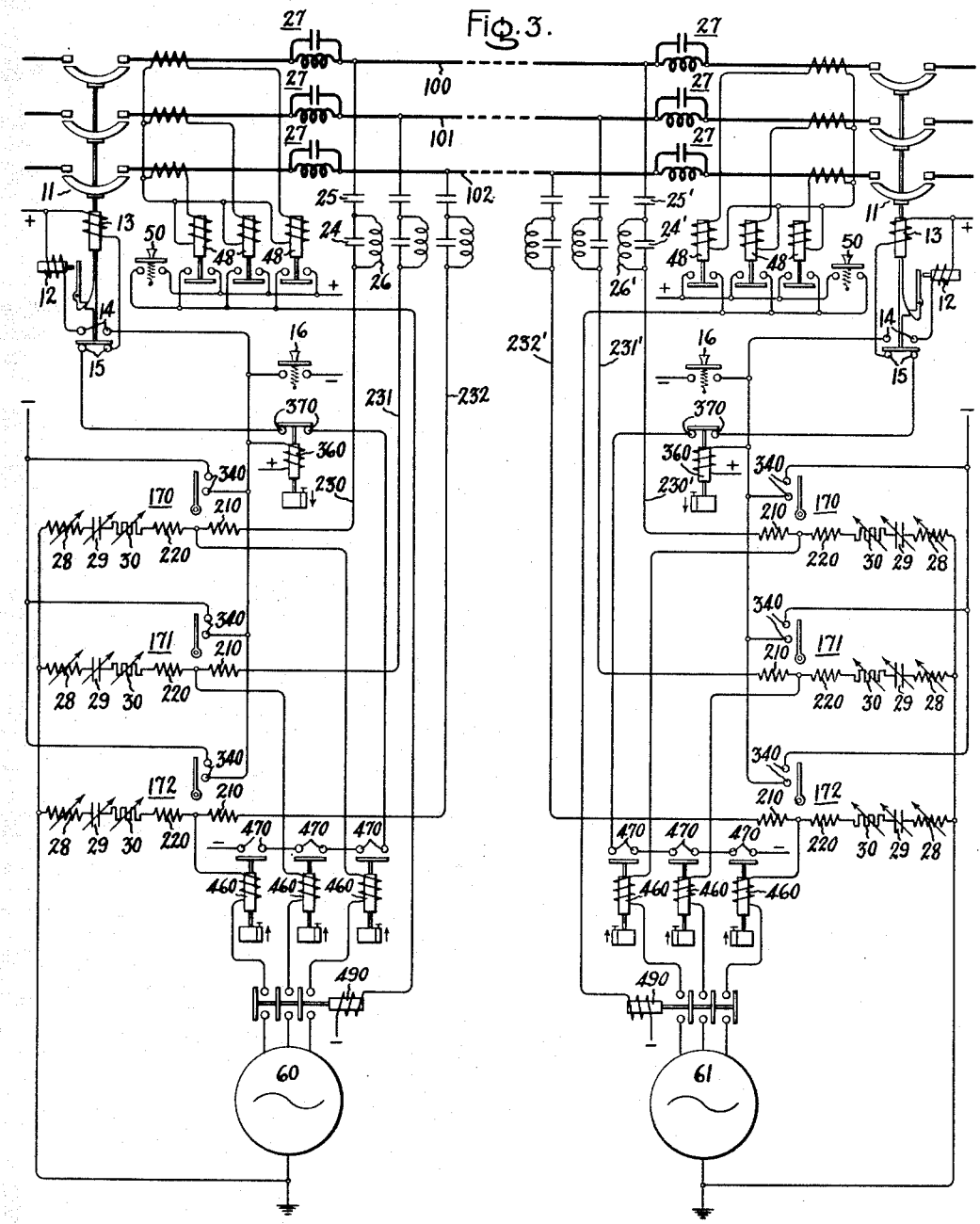

In the accompanying drawings, Fig. 1 illustrates in a single-phase diagram, for clearness, a control and protective arrangement embodying my invention and applied to an electric circuit; Fig. 2 illustrates diagrammatically an embodiment of my invention applied to the control and protection of electric apparatus having windings grounded at one end; and Fig. 3 illustrates schematically an embodiment of my invention applied to a section of a polyphase circuit.

As illustrated in Fig. 1, an electric circuit or power line 10 is arranged to be controlled by suitable circuit interrupting means such as a latched closed circuit breaker 11 which is provided with tripping and closing means indicated as coils 12 and 13 respectively. The circuits of the coils may also include the circuit breaker auxiliary switch contacts 14 and 15 respectively and in addition the trip coil circuit may include a manually operated control or opening switch 16.

In accordance with my invention, I have arranged to control and protect the line 10 through the circuit breaker 11 by means of a current whose frequency is relatively high in comparison with the frequency of the power current in the line 10. This high frequency current is supplied to two comparison circuits, one of which includes a portion of the line 10, in such a manner that the condition of balance between the currents in the two circuits as reflected in suitable electroresponsive means 17 is dependent on the condition of the line or a portion thereof.

While the frequency of the currents supplied to the two comparison circuits may be of any suitable value, I have shown as a source of such current a thermionic generator 9 which may be arranged to produce currents of radio frequency. This generator may be of any suitable type, examples of which are well known to the art, and as illustrated it includes a master oscillator tube 18 and a power amplifier tube 19 which is arranged to amplify the output of the oscillator tube 18. The output of the high frequency generator including the tubes 18 and 19 may be supplied to the two comparison circuits through an impedance matching device such as a coupling transformer 20 whose primary is connected in the plate circuit of the amplifier tube 19 and whose secondary is connected to supply the two circuits.

The two comparison circuits respectively include suitable means for producing voltages proportional to the high frequency currents which they carry. For this purpose, devices such as resistances 21 and 22 which form a part of the electroresponsive means 17. The comparison circuit including the resistance 21 is suitably connected or coupled to the line 10 through a conductor 23 and a coupling and trap circuit including condensers 24 and 25 and an inductance 26 so tuned as to permit the flow of currents of the frequency set up by the high frequency generator 9 and also so tuned as to prevent the flow of currents of a different frequency which may correspond to that of similar apparatus for controlling a circuit breaker at the other end of a section of the line 10. In order to limit or confine the flow of high frequency current over the conductors of the line 10 to a portion thereof such as a section, there may be provided trap circuits 27 as shown. In this way it is possible to control several line circuit breakers, that is, the sections between them, without using many different frequencies. The other comparison circuit which I shall term a balancing circuit is a network which may include resistance, inductance and capacitance so arranged and adjusted that it normally takes from the high frequency source a current equivalent or proportional to the high frequency current flowing in the comparison circuit coupled to the line 10. In other words the constants of the two comparison circuits should under normal line conditions be substantially identical. As shown the balancing circuit includes the resistance 22 and a balancing network including suitable impedance balancing and tuning means shown as an adjustable inductance 28, capacitance 29 and resistance 30.

While the electroresponsive means 17 may be of any differential type suitable to the frequency employed, it is shown as a thermionic device which, in addition to the resistances 21 and 22, includes a grid transformer 8 and a biased detector tube 31 working on the difference between the voltage drops in the resistances 21 and 22 so as to operate in response to the difference between the currents in the two high frequency comparison circuits. Through the transformer 8 this voltage difference is applied to the grid of the tube 31 which is normally blocked by a suitable grid biasing source 32. For switching control purposes, there is connected in the plate or output circuit of the tube 31 a control relay 33 which is arranged to control contacts 34 in the circuit of the trip coil 12 and contacts 35 in the circuit of an auxiliary relay 36. When the relay 33 is deenergized, the contacts 34 and 35 are in the circuit opening position. The auxiliary relay 36 is arranged to control contacts 37 in the circuit of the closing coil 13 and contacts 38 in the circuit of a suitable alarm or indicating device such as a bell 39 for indicating the existence of a faulty circuit condition upon attempting to close the circuit breaker. When the relay 36 is deenergized, the contacts 37 are in the circuit closing position and the contacts 38 in the circuit opening position and vice versa when the relay 36 is energized.

In order to prevent closing the circuit breaker 11 while the portion of the line, protected by the apparatus heretofore described, remains faulty and thereby to save the circuit breaker 11 from unnecessary duty, I include further means for feeling out or determining the condition of that portion of the circuit to be considered in connection with the circuit breaker 11. This means may be of the thermionic type and preferably involves a feature such as a time delay which may be sufficient merely to allow for the operation of the electroresponsive means 17 and its associated relays before energizing the circuit breaker closing means. As shown in Fig. 1, this thermionic means includes a grid biased detector tube 40 with grid voltage control dependent on the high frequency current supplied by the generator 9 to the line 10 and to the balancing circuit. For this purpose, the high frequency output of the generator 9 is coupled to the grid circuit of the tube 40 by suitable transforming means 41. For overcoming the bias of the grid source 42, the grid circuit of the tube 40 includes means involving a time delay feature and shown as a rectifier 43 and a condenser 44 in parallel with a resistance 45 across the grid circuit. In order to apply the action of the control means including the tube 40 to the closing of the circuit breaker 11, the plate or output circuit of the tube may include an auxiliary relay 46 arranged to control contacts 47 in the circuit of the closing coil 13. In this way it becomes impossible to close the circuit breaker unless the high frequency feeling out current is present. By arranging the contacts 47 in series with the contacts 37 in the circuit of the closing coil 13, the auxiliary relay 36 which, when energized, is under the control of the electroresponsive means 17, prevents the closing of the circuit breaker 11.

While the various thermionic devices described may be continuously energized, I have, as shown in Fig. 1, arranged means responsive to abnormal circuit conditions, such as an overcurrent relay 48 which, when energized by a current in excess of a predetermined value, is arranged to effect the energization of a starting relay 49 through the contacts of which the necessary plate or "B" voltages are applied to the different tubes 18, 19, 31 and 40. In order that this operation may be performed manually to feel out the circuit and effect the closing of the circuit breaker 11, there may be connected in parallel with the contacts of the current responsive relay 48 a manually controlled switch 50. The filament or "A" circuit or circuits of the tubes may be continuously energized or the energization thereof effected in response to a faulty circuit condition or otherwise in the same manner that the plate circuit is controlled as will be apparent to those skilled in the art.

Under normal circuit conditions and assuming the circuit breaker 11 closed, the various relays will be positioned as shown in the drawing. Also if the circuit breaker 11 and the closing switch 50 are open, the relays will be similarly positioned. Assuming now that the circuit breaker 11 is closed and that a fault occurs on the circuit 10 outside of the zone between the trap circuits 27 of such a nature as to effect the operation of the overcurrent relay 48 and thereby the starting relay 49 then the high frequency generating means 9 will be set in operation to supply high frequency current to both the line 10 and the balancing circuit. Because of the capacity to ground of the circuit 10, a certain amount of high frequency current will escape to ground. However, no operation of the circuit breaker 11 should occur since the fault is not within the portion of the line which the circuit breaker 11 is supposed to control. Accordingly, the balancing circuit including the impedance devices 28, 29 and 30 is so adjusted that as long as the condition of the line 10 between the trap circuits 27 is sound there will be no appreciable difference current in the comparison circuits to effect the operation of the electroresponsive means 17.

Assuming, however, that a fault such as a ground fault or the like occurs on the line 10 between the trap circuits 27, then the impedance of this portion of the circuit is changed and the high frequency current delivered to this portion of the circuit is grounded. This immediately upsets the balance in the comparison circuits. The grid bias on the tube 31 is annulled and the tube is no longer blocked. Consequently, the control relay 33 is energized and closes its contacts 34 and 35 thereby energizing the trip coil 12 of the circuit breaker and the auxiliary relay 36 which opens its contacts 37 and closes its contacts 38 to energize the alarm 39. Upon the deenergization of the circuit 10 as a consequence of the circuit breaker 11 opening, the overcurrent relay 48 returns to its deenergized position thereby effecting the deenergization of the high frequency source 9 and the parts are positioned as shown in the drawing.

Assuming now that it is desired again to energize or connect the line 10 to the source of power through the circuit breaker 11, the manually controlled switch 50 is closed to effect the energization of the starting relay 49. In consequence, high frequency currents are again effective in the comparison circuits. If the fault still exists on the line 10, the high frequency current supplied to the line will be greater than that in the balancing circuit and, consequently, the electroresponsive means 17 will energize the control relay 33 and through the latter the auxiliary relay 36. This being energized opens the circuit of the closing coil 13 at contacts 37. In the meantime, the closing control means including the tube 40 is accumulating a charge on the condenser 44. When the voltage of this charge is high enough to overcome the grid bias of the tube, the energization of the auxiliary closing relay 46 is effected and it closes its contacts 47. Inasmuch, however, as the contacts 37 in the closing coil circuit are open, the circuit breaker 11 remains open. Through the alarm 39 the operator has previously had a warning that the circuit is not in condition to be closed but, nevertheless, he cannot close it even though he maintains the manually operated closing switch 50 in the closed position.

If, however, the circuit were sound when the closing switch 50 was operated, there would be no operation of the electroresponsive means 17. The control relay 33 and the auxiliary relay 36 controlled thereby would remain deenergized with the contacts 37 of the latter closed. Consequently, the closing relay 46 which is energized through the time action of the closing control means including the tube 40 after a time sufficient to allow for the operation of the relays 33 and 36, closes its contacts 47 thereby completing the circuit of the closing coil 13 of the circuit breaker 11. When the closing control switch 50 is released, the several relays return to the positions shown in the drawing.

It will be obvious that in the event of a break in the circuit 10 between the trap circuits 27, the impedance of the part of the circuit 10 to which the high frequency source 9 is connected will change even though this part of the circuit does not become grounded. Consequently, the balance between the two comparison circuits will be upset and the electroresponsive means 17 energized so that it will be impossible to effect the closing of the circuit interrupter 11 since the circuit of the closing coil will be open at the contacts 37. If the high frequency source 9 is arranged so as to be always available to supply the comparison circuits, then even though the circuit 10 were to break, while the circuit breaker 11 is closed, without becoming grounded an opening of the circuit breaker 11 would be effected. Furthermore it is apparent that any variation in the apparatus supplying the comparison circuits automatically connects itself by reason of the differential action involved so that selectivity is not affected by such variation.

As shown in Fig. 2, the circuit 10' of electric apparatus such as generators, transformers, etc., including one or more windings 51 which are grounded through a neutral point 52, is arranged to be controlled by a circuit breaker 11 in accordance with my invention so as to protect the windings against ground faults thereon. In this case, the high frequency comparison circuit including the resistance 21 and the conductor 23 can be connected directly to the neutral to ground circuit conductor 53 of the windings 51 since this conductor is at ground potential. It is, therefore, possible economically to use a relatively low frequency, for example 500 cycles, since no coupling condenser is required. This is advantageous in view of the higher reactance of the windings of electrical apparatus as compared with portions of an electrical circuit involving arrangements such as shown in Fig. 1.

In order to insure protection of the windings 51 against ground faults as shown in Fig. 2, the high frequency current supplied to the neutral circuit and the windings 51 is confined between ground and the extremities of the windings 51 connected to the circuit 10' by suitable trap devices 27'. The high frequency source 9 which is tuned to the desired frequency may be continuously energized or brought into operation on the occurrence of a ground fault by an overcurrent relay 48 connected to be energized in response to a ground fault on the winding 51 in any suitable manner. Whether the high frequency apparatus is continuously energized or not is a matter of expediency but it is to be noted that with continuous energization, a higher sensitivity of response to ground faults will result, since the dependency of starting the arrangement on the amount of overcurrent in the neutral is eliminated. The operation of the embodiment of my invention shown in Fig. 2 both for effecting the opening and closing of the circuit breaker 11 is substantially identical to that described for the operation of the embodiment of my invention shown in Fig. 1.

In the application of my invention illustrated in Fig. 3 as applied to the selective control and protection of a section of a polyphase electric power line including conductors 100, 101 and 102 arranged to be controlled by circuit breakers 11 at the ends of the section, I employ suitable sources 60, 61 of polyphase high frequency currents and a plurality of comparison circuits connected between the respective phases of the sources and the conductors of the line. The sources 60, 61 of high frequency current are, for simplicity, indicated schematically as they form no part of my invention and as any suitable source, examples of which are well known to the art, may be employed, one form being disclosed in British Patent 287,466.

In accordance with my invention, the frequencies of the sources 60, 61 may differ from each other. In this case, the comparison circuits located at one end of the section and including the conductors 230, 231, 232 will also include coupling and tuning devices such as condensers 24 and 25 and an inductance 26 so arranged as to permit the flow of high frequency current corresponding to the frequency of the source 60 but to prevent the flow of high frequency current corresponding to the frequency of the source 61. Similarly, at the other end of the section, the comparison circuits including the conductors 230', 231' and 232' are arranged to permit the flow of high frequency current corresponding to the frequency of the source 61 but to prevent the flow of high frequency current corresponding to the frequency of the source 60. As before, the flow of the high frequency currents of the frequency 60, 61 over the conductors of the line is limited to the section to be controlled by suitable trap circuits 27. In parallel with the comparison circuits, I connect the balancing circuits which include the network impedance devices 28, 29 and 30. These are respectively so adjusted, for the frequency of the source associated with the balancing circuit, that the differential electroresponsive means 170, 171, 172 shown, for simplicity, as including two windings 210, 220 are balanced and inoperative while the line section is normal. The differential electroresponsive devices are shown as including contacts 340 in the circuits of the trip coils 12.

While the high frequency currents may be continuously applied to the line they may, if desired, be applied only in case of abnormal circuit conditions or when it is desired to feel out the condition of the circuit. In the latter case, suitable fault responsive means such as overcurrent relays 48 or a manually operated switch 50 may be arranged to energize the line with the high frequency currents through suitable switching means indicated as a starting relay 490.

For feeling out purposes and particularly in order to prevent closing a circuit breaker on a faulty line section, I provide the auxiliary relays 360 and 460. The auxiliary relay 360 is under the control of the differential electroresponsive devices 170, 171, 172 and is arranged to control contacts 370 in the circuit of the closing coil 13 of the circuit breaker 11. The auxiliary relays 460 also control contacts 470 in the circuit of the closing coil 13 of the circuit breaker. In order to prevent closing the circuit breaker unless every phase conductor is sound, the auxiliary relays 470 are arranged to be responsive to the currents in the comparison circuits connected to the respective phase conductors and have their contacts connected in series in the closing coil circuit.

In order to prevent any possible action of the auxiliary relays 460 prior to the auxiliary relay 360 opening its contacts 370, these relays are suitably interlocked. For this purpose time action may be employed. In this case, the auxiliary relay 360 may be a substantially instantaneous circuit opening time delay closing relay and the auxiliary relays 460, time delay closing relays with a quick opening action.

Assuming that the circuit breakers 11 are closed and the power line is sound, the various relays and switches with the exception of the circuit breaker auxiliary switches will be positioned as shown in the drawing. In case of a fault on the line outside of the section between the circuit breaker 11 and of such a character as to operate one or more of the overcurrent relays 48, and thereby to effect the operation of the auxiliary relays 490, high frequency currents from the sources 60 and 61 will be supplied to the line section. Inasmuch, however, as the line section is sound, the balance of the high frequency currents in each pair of comparison circuits including the differential electroresponsive means will be maintained and the circuit breakers 11 will remain closed. In case of a fault such as the grounding of one of the conductors, for example, the conductor 100, the overcurrent relays 48 associated with this conductor will respond and high frequency current will be supplied to the conductor 100 from each of the sources 60, 61. In this case, the balances between the high frequency currents in the windings 210 and 220 of the differential electroresponsive device 170 at each end of the section will be upset and these devices will operate to effect the tripping of the circuit breakers at the respective ends of the section, the action being just as described in connection with the modification of my invention shown in Fig. 1.

In case of a fault between the phases but outside of the section between the circuit breakers 11 involving, for example, phase conductors 100 and 101, the overcurrent relays associated with these conductors will respond and connect the sources 60, 61 to the line. Inasmuch, however, as the network devices 28, 29 and 30 and their respective balancing circuits are so adjusted as to maintain equal effects in the windings 210 and 220 of the differential electroresponsive devices under these conditions no action of these devices will occur and the circuit breaker 11, will remain closed. If, however, the fault is within the section between the circuit breaker 11, for example, a short-circuit between the conductors 100 and 101, a short-circuited path is provided for the high frequency currents supplied to these two conductors. In this case the comparison circuits including the conductors 230 and 231 and the windings 210 of the differential electroresponsive devices 170 and 171 carrying a high frequency current differing from that in the corresponding balancing circuits including the windings 220 of the devices 170 and 171. With this disturbance in the normal balance between the respective comparison circuits one or more of the differential electroresponsive devices closes its contacts 340 thereby effecting the opening of the circuit breakers 11 at each end of the section. At the same time, the auxiliary relays 360 are energized to open the circuits of the closing coils at the contacts 370.

Assuming that the circuit breakers are open as shown in Fig. 3 and that it is desired to close them, the procedure is as follows. The closing control switch 50 is operated and thereby completes the circuit of the starting relay 490 so as to apply high frequency currents to the line conductors through the comparison circuits. It is immaterial which of the control switches 50 is operated first or whether both are operated simultaneously. If the line is faulty, when high frequency currents are applied, some one or more of the differential electroresponsive devices 170, 171, 172 at the ends of the section will operate and effect the energization of the associated auxiliary relay 360 which operates substantially instantaneously to open its contacts 370 in the circuit of the closing coil 12. Subsequently, the auxiliary relays 460 are operated to close their contacts 470 but as the closing coil circuit is open then, the contacts 370 of the circuit breaker 11 remain open. When the closing control switch 50 is released, the relays return to the position shown. If, however, the line is sound when the switch or switches 50 is or are closed then the auxiliary relays 360 remain deenergized and at the expiration of the interlocking time delay of the relays 460, the circuit of the closing coil 12 is completed through the contacts of these relays at the station and the circuit breaker is closed.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is,—

1. In combination with an electric power line, circuit controlling means therefor including a circuit interrupter, a source of high frequency current, two comparison circuits, one being connected to said line and arranged to be energized by said high frequency current, means for energizing the other circuit, means connected and arranged to be energized responsively to the difference between the currents in said circuits, and means controlled by said current difference responsive means for controlling the closing of said circuit interrupter.

2. In combination with an electric power line and circuit interrupting means therefor, a source of relatively high frequency current, two circuits arranged to be supplied with current from said source, one of said circuits including a portion of said line, protective means responsive to the relative values of the high frequency currents in said circuits for effecting the opening of said interrupting means on the occurrence of abnormal circuit conditions and means under the control of said protective means for permitting the closing of said circuit interrupting means only when the circuit is normal.

3. In combination with an electric power line, circuit interrupting means therefor, a source of relatively high frequency current, two circuits arranged to be supplied with current from said source, one of said circuits including a portion of said line, protective means for effecting the opening of said circuit interrupting means on the occurrence of abnormal circuit conditions connected to be energized in accordance with the difference between the high frequency currents in said circuits and control means cooperating with said protective means for effecting the closing of the circuit breaker only when the circuit is normal.

4. In combination with a polyphase alternating current power line, circuit controlling means therefor including a source of polyphase currents of a frequency relatively higher than the frequency of the line currents, comparison circuits between the respective phases of said source and the conductors of the line, means for limiting the flow of said high frequency currents over the conductors of the line to a portion thereof, balancing circuits respectively connected in parallel with said comparison circuits, and normally balanced differential electroresponsive devices each including means respectively connected in a comparison circuit and its associated balancing circuit, said means being arranged to exert a balancing effect dependent on the normal impedance condition of said line portion.

5. In combination with an electric power line, circuit controlling means therefor including a circuit interrupter, a balancing circuit, means for supplying a relatively high frequency current to said line and to said balancing circuit, means for limiting the flow of said high frequency current over said line to a portion thereof, differential electroresponsive apparatus for effecting the opening of said interrupter on the occurrence of a fault on said line portion including means connected to be energized respectively in accordance with the high frequency currents supplied to said line and said balancing circuit, and means responsive to the high frequency current supplied to said line and said balancing circuit for controlling the closing of said interrupter.

6. In combination with an electric power line, circuit controlling means therefor including a circuit interrupter, a balancing circuit, means for supplying relatively high frequency current to said line and to said balancing circuit, means for limiting the flow of said high frequency current over said line to a portion thereof, differential electroresponsive apparatus for effecting the opening of said interrupter on the occurrence of a fault on said line portion including means connected to be energized respectively in accordance with the high frequency currents supplied to said line and said balancing circuit, means responsive to the high frequency current supplied to said line and said balancing circuit for controlling the closing of said interrupter, and means controlled by said electroresponsive apparatus for preventing the closing of the interrupter while said line portion is faulty.

7. In combination with an electric circuit, means for controlling a section thereof including circuit interrupters adjacent the ends of a section of the electric circuit and differential means for selectively controlling said circuit interrupters on the occurrence of abnormal circuit conditions so as to effect their opening only on the occurrence of a fault within the section including a pair of comparison circuits for each circuit interrupter, one of each of said pairs of circuits being connected to said section, means for supplying relatively high frequency currents to said pairs of comparison circuits, and means controlled by said differential means for controlling the closing of said circuit interrupters.

8. In combination with an electric circuit, means for controlling a section thereof including circuit interrupters adjacent the ends of a section of the electric circuit and differential means for selectively controlling said circuit interrupters on the occurrence of abnormal circuit conditions so as to effect their operation only on the occurrence of a fault within the section including a pair of comparison circuits for each circuit interrupter, one of each of said pairs of circuits being connected to said section and means for supplying relatively high frequency currents to said pairs of comparison circuits, the frequency of the current supplied to one of said pairs being different from the frequency of the current supplied to the other pair, means for preventing the flow of said high frequency currents over the conductors of the electric circuit outside of said section, and means controlled by said differential means for preventing the closing of the circuit interrupters while the circuit section is faulty.

9. In combination with an electric power line and circuit interrupting means therefor, a source of relatively high frequency current, two comparison circuits arranged to be supplied with current from said source, one of said circuits including a portion of said line, control means responsive to the relative values of the high frequency currents supplied to said circuits by said source for controlling the operation of said circuit interrupting means and means controlled by said control means for preventing the closing of said circuit interrupting means while the line is abnormal.

In witness whereof, I have hereunto set my hand this 29th day of April, 1929.

ALAN S. FITZ GERALD.